United States Patent [19]
Paige

[11] Patent Number: 5,462,045
[45] Date of Patent: Oct. 31, 1995

[54] PRESSURIZED STEAM HEATED COOKING PAN

[76] Inventor: Martin G. Paige, 123 Ravenna Dr., Long Beach, Calif. 90803

[21] Appl. No.: 360,240

[22] Filed: Dec. 20, 1994

[51] Int. Cl.[6] ................................................. A47J 27/06
[52] U.S. Cl. ............................ 126/378; 220/428; 99/403
[58] Field of Search ............................ 126/376, 377, 126/378; 220/428; 99/403, 377

[56] References Cited

U.S. PATENT DOCUMENTS

| | | |
|---|---|---|
| 1,089,164 | 3/1914 | Szunyik ................................. 126/378 |
| 3,057,603 | 10/1962 | Isreeli . |
| 3,539,075 | 11/1970 | Bautista . |
| 3,641,992 | 2/1972 | Peyser et al. . |
| 4,331,127 | 5/1982 | Grosso . |
| 4,574,776 | 3/1986 | Hidle . |
| 4,604,989 | 8/1986 | Kita . |
| 4,823,980 | 4/1989 | Ejiri . |
| 5,092,229 | 3/1992 | Chen . |

FOREIGN PATENT DOCUMENTS 15922 of 1903 United Kingdom ................... 126/378

*Primary Examiner*—Carroll B. Dority
*Attorney, Agent, or Firm*—James G. O'Neill

[57] ABSTRACT

A cooking pan is provided with an open inner cooking pan member and an outer shell member sealed to the inner pan to form an enclosure between the members. The inner pan and outer shell are sealing secured together with a gasket, a plurality of insulating washers and insulating sleeves therebetween so that there is no metal-to-metal contact between the inner and outer members. Water is added to and heated in the enclosure to form pressurized steam, controlled by a pressure control valve fixed to the inner pan, so as to allow high temperature, pressurized steam to quickly heat the inner pan and cook food items, such as sauces and the like, held therein, without burning them.

17 Claims, 2 Drawing Sheets

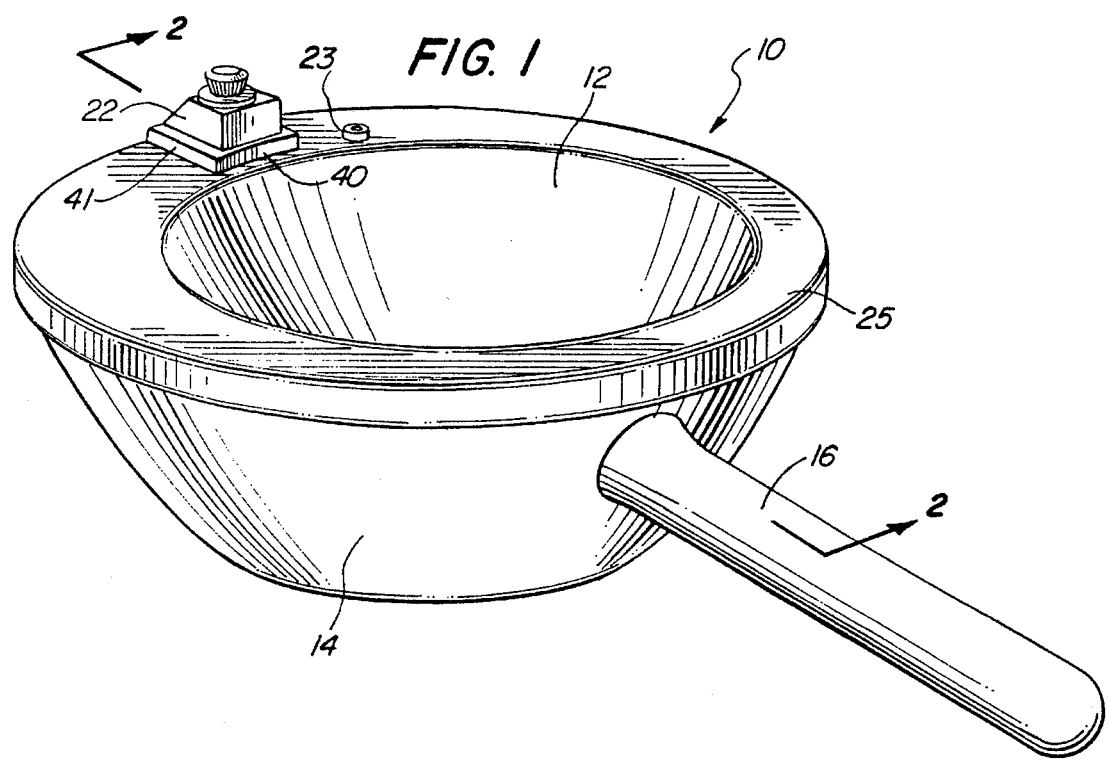
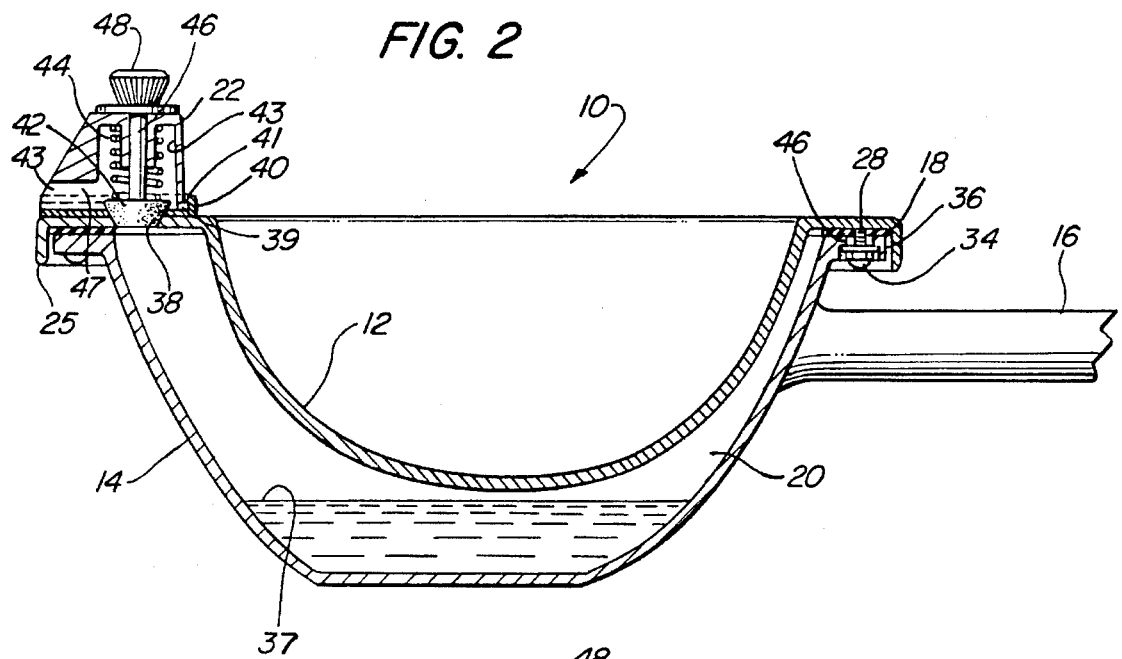
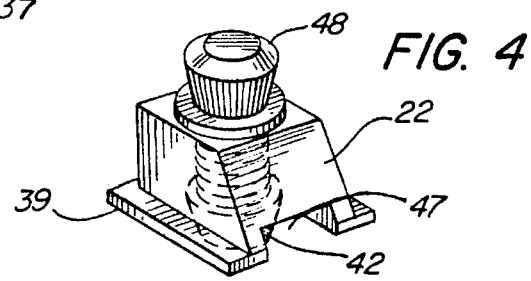

5,462,045

PRESSURIZED STEAM HEATED COOKING PAN

BACKGROUND OF THE INVENTION

1. Field of the Invention

This invention relates generally to cooking pans and more particularly to an improved cooking pan assembly having inner and outer members with a pressurized steam heating space formed therebetween for quickly and safely cooking sauces and the like, at temperatures above 300 degrees F.

2. Description of Related Art

Many types of heating assemblies, including double boilers or cooking vessels are known, having inner members inserted in outer members. Water is inserted in one of the members, such as the outer member and the outer member is heated to heat the water for various reasons, including the cooking of food items placed in the inner member of such double boilers. The inner and outer members of known heating assemblies are connected together in various fashions and generally include one or more covers added or secured to the top of either or both the inner member and the outer member. Some of the known double boilers also include openings connecting the interior of the inner and outer members to allow steam from the heated water in the space between the members to enter the interior of the inner member to steam food items held in the inner member.

However, as the popularity of eating out as well as cooking gourmet meals at home has increased over the years, the need for a cooking utensil which quickly and safely cooks food items such as sauces and the like without burning them, has also risen significantly. The currently available cooking vessels or double boilers have proven to be useful in heating or steaming some food items, but lacking in quickly heating or cooking food items such as sauces and the like. Therefore, many cooks or chefs have had to make do with available saucepans, and/or resort to other slow cooking methods and/or systems in an effort to prepare sauces and soups. Although these known pans do enable a cook or chef to prepare such food items, they do not allow the flavors of the sauces or soups to be ideally blended together, nor do they easily and quickly cook such items in a consistent manner. Therefore, there exists the need for a simple, low-cost and easy to manufacture and use cooking pan or system, useful in many situations, but which is particularly useful for cooking sauces and soups, so as to provide flavorful, consistent, quality sauces and soups in as short a time as possible, with an emphasis on safety.

Examples of known prior art heating assemblies of double boilers are shown in the following U.S. Pat. Nos. 3,057,603 to Isreeli, 3,539,075 to Bautista, 3,641,992 to Peyser et al, 4,331,127 to Grosso, 4,574,776 to Hidle, 4,604,989 to Kita, 4,823,980 to Ejiri and 5,092,229 to Chen. These patents, however, fail to disclose a cooking vessel for food items such as sauces or the like having an open inner pan utilizing only high temperature steam to quickly and consistently heat the pan, equally from the sides as well as below, to produce high temperatures which ideally cook sauces and the like to produce consistently better tasting food items without burning.

SUMMARY OF THE INVENTION

Accordingly, it is a general object of the present invention to provide an improved cooking pan. It is a particular object of the present invention to provide an improved cooking pan which is easy to manufacture and use. It is a still more particular object of the present invention to provide an improved cooking pan which includes a jacketed steam area for quickly heating sauces and the like placed within an inner pan. It is yet a more particular object of the present invention to provide an improved cooking pan in which pressurized steam formed in an internal chamber is used to heat all surfaces an inner pan with an even high heat. It is a further object of the present invention to provide an improved cooking pan which contains a removable valve means for controlling the pressure and temperature of steam in an internal chamber used for heating an inner pan. It is yet another object of the present invention to provide an improved cooking pan having an outer member connected to an inner pan so as to have no metal parts touching, to thereby prevent any heat from being conducted between the outer member and the inner pan, except by steam produced in a chamber formed therebetween. And, it is yet a further object of the present invention to provide an improved cooking pan which uses pressurized steam generated in an interior chamber to quickly and consistently cook sauces and the like by providing an even and constant temperature on all areas of the cooking surface.

In accordance with one aspect of the present invention, there is provided an open inner pan and an outer heating shell sealed to the open inner pan to form an interior chamber therebetween. An elongated handle is connected to the exterior of the outer heating shell. The open inner and the outer heating shell are secured together in such a manner that there is no metal-to-metal contact therebetween so that pressurized steam formed in the interior chamber, controlled by a removable valve means, allows high temperature, pressurized steam to quickly cook or heat food items, such as sauces and the like, as they are held in the open inner pan with an even temperature from the sides as well as below.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a perspective view of a preferred embodiment of a cooking pan in accordance with the present invention;

FIG. 2 is a sectional view of the cooking pan taken along line 2—2 of FIG. 1;

FIG. 4 is a perspective view of a preferred embodiment of the steam pressure control valve of the present invention.

DESCRIPTION OF THE PREFERRED EMBODIMENTS

Figure 3:
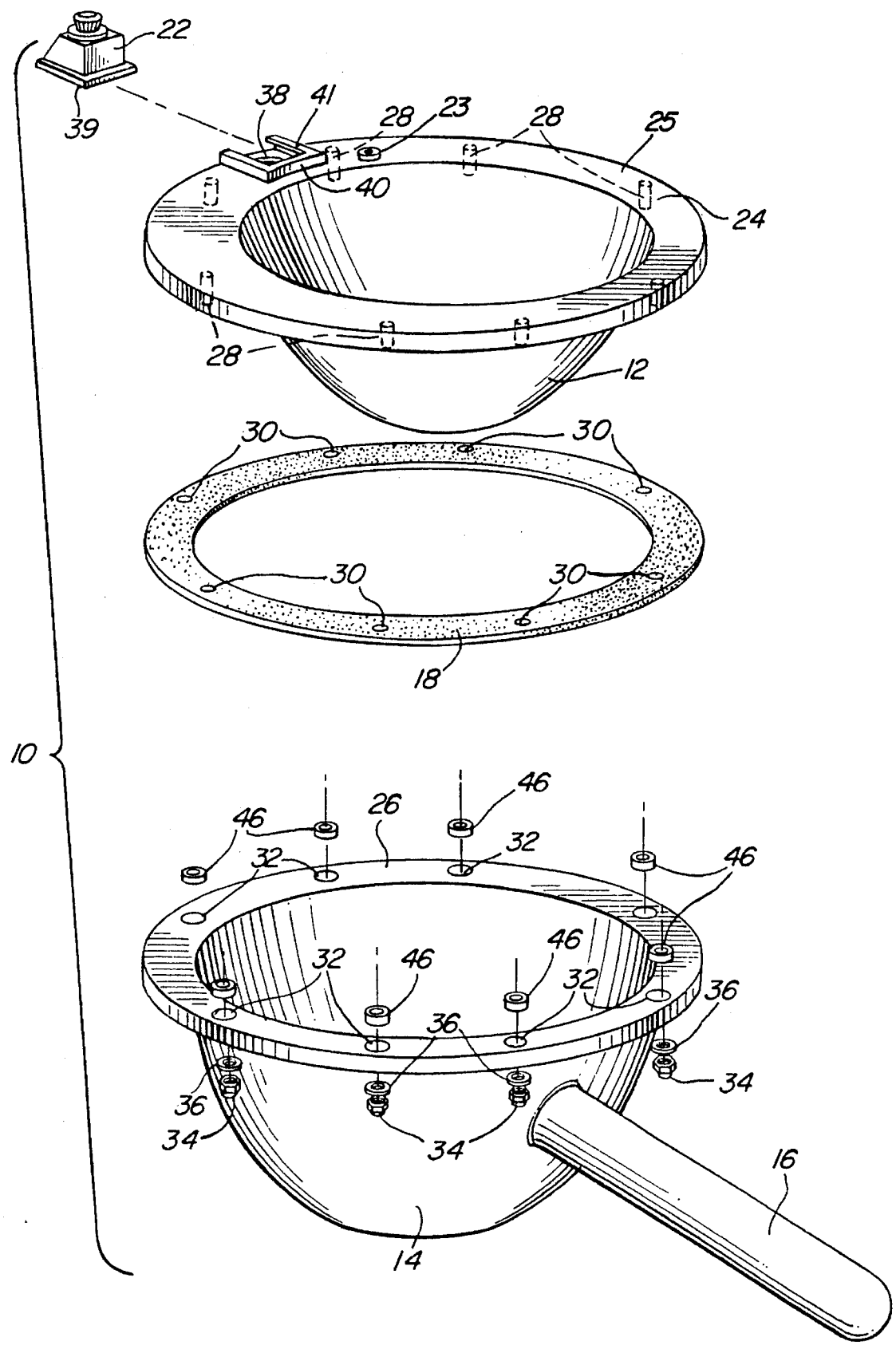
FIG. 3 is an exploded perspective view of the cooking pan of FIG. 1.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to describe an improved pressurized steam cooking pan, identified generally at 10, for use in cooking or heating food items, and particularly for sauces and the like.

It is to be understood that the present invention provides an open cooking pan for use in quickly cooking any food items by pressurized steam at temperatures over 300 degrees F., and preferably between the range of 300 to 400 degrees F. This cooking pan is particularly useful for, and specifically described herein, for purposes of description only and not by way of limitation, to cook sauces and the like.

Turning now to FIGS. 1–4 of the drawings, the pressurized steam cooking pan assembly 10 of the present invention is shown as comprising an inner cooking member 12, such as a shallow saucepan, a heating or outer shell member 14, a handle 16 secured to an exterior surface of the outer shell member 14, a gasket means 18 secured between the inner and outer members (explained more fully below), a sealed interior pressure chamber or opening 20 formed between the inner and outer members (see FIG. 2), a removable valve means 22, which acts as a combination water insertion and pressure control valve means, and a safety pressure relief pin or blow out valve means 23. Either member 12, 14 may take any desired shape, but the inner pan 12 is preferably formed as an easily cleaned fairly rounded pan, so as to heat or cook sauces or the like, in the manner of known sauce pans. However, the pan 10 of the present invention cooks such sauces or the like in a more consistent manner, at higher temperatures, without burning them, and with enhanced flavors. Both the inner cooking pan 12 and outer shell member 14 may be made from any available heat conductive metallic material that is strong enough to resist abrasion, corrosion, and tampering with, such as a stainless steel, black anodized steel or aluminum, cast iron, or the like.

As shown in FIGS. 2 and 3, both the inner pan 12 and the outer shell 14 are provided with integral outwardly extending peripheral flanges 24 and 26. The flange 24 on the inner pan 12 ends at its outer periphery in a downwardly depending outer edge 25 of sufficient length to cover the securing means for the pan, as set forth more fully below. The flange 24 also includes a plurality of spaced apart downwardly depending fastening means 28, preferably 8 in number, such as threaded fasteners, formed integrally therewith or secured thereto, in any known manner. The outer shell 14 and the non-metallic gasket means 18 include an equal number of aligned openings 30, 32 formed around the entire circumference thereof, through which the downwardly depending fastening means pass so as to secure the inner pan 12 and outer shell 14 together, as shown more clearly in FIG. 2. Insulating non-metallic sleeve members 46 are inserted in the openings 32 of the peripheral flange 26 of outer shell 14 to prevent metal-to-metal contact between the fastening means 28 and the peripheral flange 26.

Securing means 34, such as nuts, rivets or the like, are fixed to the ends of the fastening means, and insulating and spacing means 36, such as non-metallic washers, are used between the securing means 34 and the lower surface of the peripheral flange 26 of the outer shell 14.

The fastening means 28, securing means 34, insulating sleeve members 46, and washers 36 are fixed together or tightened so as to firmly secure the peripheral flanges 24 and 26 together with the sealing and insulating gasket 18 between the peripheral flanges, so as to form a steam/water tight seal therebetween, and thereby fully enclose the interior chamber or opening 20. Furthermore, in the secured position, the downwardly depending edge 25 preferably covers and hides the peripheral flange 26 of outer shell 14, as well as the securing means 34 and spacing means 36, to provide a more pleasing appearance to the assembled pan 10.

The peripheral flange 24 of inner pan 12 is formed with a water filler aperture 38 passing therethrough, to allow water to be poured into interior chamber 20, up to a predetermined level 37, below the lowest level of the inner surface of the inner pan 12. That is, preferably the water level 37 should not touch the inner pan 12, so as to only allow the pan 12 to be heated by pressurized steam, formed in chamber 20.

The aperture 38 is controlled by valve means 22, which is removably captured within a U-shaped holding means 40, having an overhanging lip means 41, of a type know to those skilled in the art. The U-shaped holding means is secured to the upper surface of the peripheral flange 24, over the aperture 38. As shown in FIG. 3, the valve means 22 is slidably removed from the U-shaped holding means 40 to open the aperture 38, to allow water to be poured into the interior chamber 20. When the interior chamber 20 is filled to the desired level 37, not touching the lower surface of pan 12, the valve means 22 is slid back into the U-shaped holder 40, by means of a flange 39 secured to the valve means, until the end of the flange abuts the rear wall of U-shape holder 40 and a valve member 42 drops into and is sealingly captured in the aperture 38. The valve means 22 includes a hollow interior portion 43 (see FIG. 2) in which the valve member 42 is movably mounted. The valve member 42 is preferably biased into contact with aperture 38, as by means of a calibrated spring 44. The spring 44 is accurately calibrated so as to open upon a predetermined pressure being reached within interior chamber 20 and applied against valve member 42. Additionally, valve member 42 is preferably mounted to a stem 46 secured to a pull means, such as a knob 48, to allow the valve member 42 to be manually released. Therefore, when the valve member 42 is raised from aperture 38, either by steam pressure or manually by knob 48, it first releases the steam pressure within inner interior chamber 20 which allows the steam to escape through aperture 47. Then,if desired, the raised knob 48 is used to slide the flange 39 of valve means 22 out of the holding lips 41 of U-shaped holder 40.

As best shown in FIGS. 2 and 3, the size of peripheral flange 24 of inner pan 12 is not even throughout its circumference. That is, the peripheral flange is larger on one side, the left side when looking at FIG. 2, so that when the members are assembled together, the inner pan 12 is eccentrically located with respect to the outer shell 14. This larger side of the peripheral flange 24 enables sufficient space or room for aperture 38, U-shaped holder 38 and valve means 22 to be secured thereto so as to control the pouring of water into, and the pressure of steam within the interior chamber 20.

In use, the pan 10 is first assembled without valve means 22 thereon, water is inserted or poured into the hollow or interior chamber 20 formed between the inner and outer members until the predetermined level 37 is reached. Valve means 22 is then slid into U-shaped holder 40 until the valve member 42 is seated in and seals the aperture 38. The assembled pan with the water therein and the valve means in place is then placed on a heat source such as a heating element, and the lower surface of outer shell 14 is heated so that the water within the interior chamber 20 is sufficiently heated to boil and form steam within the interior chamber. The steam formed within interior chamber 20 will then heat the interior pan 12 from all sides evenly, in such a manner that any food items contained within the open inner pan 12 will then be quickly cooked, without burning.

In a preferred embodiment of the invention, the pressurized steam within the chamber 20 is allowed to reach temperatures over 300 degrees, and preferably ranging between 300 and 400 degrees Fahrenheit so that the pan 12 is consistently and quickly heated only by the steam so as to cook or heat sauces and the like contained therein, without burning them, and to impart the full flavor of the blended ingredients contained therein to the cooked or heated sauces. Because the inner and outer pans are secured together with no metal-to-metal contact, i.e., the gasket means 18, washers 36 and insulating sleeve members 46 within the apertures 28 prevent any metal-to-metal contact, only the steam within the interior chamber 20 will heat the inner pan evenly from all sides, thereby providing the consistent and quick results desired. The cooking pan 10 of the present invention cooks or heats only by means of the heating of the open top inner pan 12, by the pressurized steam within the interior chamber 20 thereof, which pressurized steam, at a known pressure and temperature maintained by the valve means 22, to enable more consistent, better flavor sauces and the like to be prepared in a shorter period of time.

It, therefore, can be seen that the steam heated cooking pan of the present invention includes separate inner and outer members secured together to form a secured and pressurized space or opening therebetween where water may be added and heated so as to produce pressurized steam to quickly cook food items positioned in the open top inner member, in such a manner that consistent high quality, better tasting food items, such as sauces or soups are prepared.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What I claim is:

1. A cooking pan comprising, in combination:
   a metallic outer shell member having inner and outer surfaces, an open top, a peripheral flange formed on and completely surrounding said open top, and a handle secured to the outer surface thereof;
   a metallic inner pan having an open top and a peripheral flange formed on and completely surrounding said open top;
   said metallic inner pan being received in and secured to said metallic outer shell member with an interior chamber formed therebetween for holding water and steam;
   an insulating gasket provided between said peripheral flange of said metallic outer shell and said peripheral flange of said metallic inner pan;
   said peripheral flange of said metallic inner pan having a plurality of fastening means depending from a lower surface thereof so as to pass through a plurality of openings formed in and passing through said peripheral flange of said metallic outer shell member with said gasket therebetween;
   a plurality of securing means fixed to said fastening means to secure said peripheral flanges together; and
   a plurality of insulating sleeves provided in said plurality of openings, around said fastening means, whereby said gasket and said insulating sleeves prevent any metal-to-metal contact between said metallic outer shell member and said metallic inner pan.

2. The cooking pan of claim 1, further including a water filler and steam release aperture formed in and passing through said peripheral flange of said metallic inner pan for pouring water into said interior chamber, and a valve means releasably secured to said peripheral flange of said metallic inner pan for selectively blocking said water filler and steam release aperture.

3. The cooking pan of claim 2 wherein said valve means is slidably secured in a U-shaped holder secured around said aperture on an upper surface of said peripheral flange of said metallic inner pan.

4. The cooking pan of claim 3 wherein said valve means includes a further flange means secured thereto and is slidably held in said U-shaped holder by overhanging lips formed on said U-shaped holder.

5. The cooking pan of claim 2 wherein said valve means includes a pull means secured to an inner valve member for selectively opening and closing said aperture.

6. The cooking pan of claim 5, further including a calibrated biasing means cooperating with said inner valve member to allow said valve member to control the pressure of steam formed in said interior chamber when heat is applied to said metallic outer shell to boil water in said interior chamber.

7. The cooking pan of claim 6 wherein said valve means includes a further flange means secured thereto and is slidably held in said U-shaped holder by overhanging lips formed on said U-shaped holder.

8. The cooking pan of claim 7, further including a plurality of insulating washers between said plurality of securing means and lower surface of the peripheral flange adjacent said plurality of securing means.

9. The cooking pan of claim 1, further including a water filler and steam release aperture formed in and passing through said peripheral flange of said metallic inner pan for pouring water into said interior chamber, and a valve means releasably secured to said peripheral flange of said metallic inner pan for selectively opening and closing said water filler and steam release aperture; said valve means including an outer flange which is slidably secured in lip means formed on a U-shaped holder secured around said aperture on an upper surface of said peripheral flange of said metallic inner pan.

10. The cooking pan of claim 9 wherein said metallic inner pan is formed as a rounded saucepan, and said valve means includes a pull means secured to said inner valve member for selectively opening and closing said aperture, and a calibrated spring means surrounding a stem secured between said pull means and said inner valve member; and said spring means cooperates with said inner valve member to allow said inner valve member to control the pressure of steam formed in said interior chamber when heat is applied to said metallic outer shell member to heat and boil water in said interior chamber.

11. The cooking pan of claim 10 wherein said valve means includes a further flange means secured thereto which is slidably held in overhanging lips formed on a U-shaped holder secured to said peripheral flange formed on said rounded saucepan.

12. The cooking pan of claim 1, further including an outer edge formed to said peripheral flange of said metallic inner pan, said outer edge sized and dimensioned to cover and hide said peripheral flange formed on said metallic outer shell member and said fastening means.

13. A cooking pan comprising, in combination:
   a metallic outer shell member having a bottom, sides with inner and outer surfaces, an open top, a peripheral flange formed on an completely surrounding said open top, and a handle secured to the outer surface thereof;
   a metallic inner pan having an open top and an elliptically shaped peripheral flange formed on and completely surrounding said open top;

said metallic inner pan being formed in the shape of a rounded saucepan and received in and secured to said metallic outer shell member by the peripheral flanges, with an interior chamber formed therebetween for holding water and steam;

an insulating gasket provided between said peripheral flange of said metallic outer shell and said elliptically shaped peripheral flange of said metallic inner pan;

said elliptically shaped peripheral flange of said metallic inner pan having a plurality of fastening means depending from a lower surface thereof so as to pass through a plurality of aligned openings formed in and passing through said insulating gasket and said peripheral flange of said metallic outer shell member;

a plurality of securing means fixed to an end of said fastening means to secure said peripheral flanges together;

a water filler and steam release aperture formed in and passing through a larger side of said elliptically shaped peripheral flange of said metallic inner pan for pouring water into and allowing steam to escape from, said interior chamber;

a removable valve means releasably secured to an upper surface of said peripheral flange of said metallic inner pan in a U-shaped holder secured around said aperture, for selectively opening and closing said water filler and steam release aperture; and a plurality of insulating sleeves held in said plurality of openings, around said fastening means, whereby said gasket and said insulating sleeves prevent any metal-to-metal contact between said metallic outer shell member and said metallic inner pan.

14. The cooking pan of claim 13, further including a plurality of insulating washers between said plurality of securing means and a lower surface of the peripheral flange adjacent said plurality of securing means.

15. The cooking pan of claim 14 wherein said valve means includes a knob secured to an inner valve member seated in said aperture for selectively opening and closing said aperture.

16. The cooking pan of claim 15, further including a calibrated spring biasing means surrounding a stem and coacting with said inner valve member to allow said valve member to be moved to control the pressure of steam formed in said interior chamber when heat is applied to said metallic outer shell to heat and boil water in said interior chamber, and for removal of said valve means for adding water to said interior chamber.

17. The cooking pan of claim 16, further including an outer edge formed to said elliptically shaped peripheral flange of said metallic inner saucepan, said outer edge sized and dimensioned to cover and hide said elliptically shaped peripheral flange formed on said metallic outer shell member, said plurality of fastening means and said plurality of securing means.

* * * * *

UNITED STATES PATENT AND TRADEMARK OFFICE
CERTIFICATE OF CORRECTION

PATENT NO. : 5,462,045
DATED : October 31, 1995
INVENTOR(S) : Martin G. Paige

It is certified that error appears in the above-indentified patent and that said Letters Patent is hereby corrected as shown below:

```
Column 1, line 1, delete "at temperatures above 300
degrees F" and insert -- above the temperature of
boiling water --.  Column 3, lines 3 - 5 delete "over
300 degrees F, and preferably between the range of 300
to 400 degrees F" and insert -- above the temperature
of boiling water --.
```

Signed and Sealed this

Twelfth Day of March, 1996

Attest:

BRUCE LEHMAN

*Attesting Officer*   *Commissioner of Patents and Trademarks*